(12) United States Patent
Papanikolaou et al.

(10) Patent No.: US 12,269,422 B2
(45) Date of Patent: Apr. 8, 2025

(54) AUTOMATIC CLOSURE ACTUATION BASED ON OBJECT DETECTION

(71) Applicant: Rivian IP Holdings, LLC, Irvine, CA (US)

(72) Inventors: Kosta Papanikolaou, Corona, CA (US); Thorsten Luedtke, Orange, CA (US); Shukan Shitalkumar Parekh, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/104,775

(22) Filed: Feb. 1, 2023

(65) Prior Publication Data
US 2024/0253595 A1    Aug. 1, 2024

(51) Int. Cl.
| | |
|---|---|
| *B60R 25/24* | (2013.01) |
| *B60R 25/30* | (2013.01) |
| *G06V 10/764* | (2022.01) |
| *G06V 20/56* | (2022.01) |
| *G07C 9/00* | (2020.01) |

(52) U.S. Cl.
CPC ............ *B60R 25/24* (2013.01); *B60R 25/305* (2013.01); *G06V 10/764* (2022.01); *G06V 20/56* (2022.01); *G07C 9/00309* (2013.01); *G07C 2009/00507* (2013.01)

(58) Field of Classification Search
CPC .... B60R 25/24; B60R 25/305; G06V 10/764; G06V 20/56; G07C 9/00309; G07C 2009/00507; E05F 15/73
See application file for complete search history.

(56) References Cited

U.S. PATENT DOCUMENTS

| | | | | |
|---|---|---|---|---|
| 2020/0193643 A1* | 6/2020 | Hess | ...................... | G06V 10/44 |
| 2021/0214990 A1* | 7/2021 | Morosawa | .............. | E05B 81/78 |
| 2022/0019767 A1* | 1/2022 | Burk | ...................... | G06F 18/217 |

* cited by examiner

*Primary Examiner* — Vernal U Brown
(74) *Attorney, Agent, or Firm* — BAKERHOSTETLER (57) ABSTRACT

An automatic actuation of one or more vehicle closures may be based on object detection. A device may include at least one processor configured to detect an authorized user within a proximity of a vehicle, detect an object within a proximity of the authorized user, and cause an actuation associated with a closure of the vehicle based at least in part on the detected authorized user and the detected object.

20 Claims, 5 Drawing Sheets

AUTOMATIC CLOSURE ACTUATION BASED ON OBJECT DETECTION

INTRODUCTION

Vehicles often include spaces defined by one or more closures. For example, a trunk may be defined by one or more walls and a closure for accessing the trunk.

SUMMARY

The present description relates generally to the automatic actuation (e.g., opening) of vehicle closures, including, for example, a vehicle's rear trunk, front trunk (e.g., frunk), side door, gear tunnel door, and the like. One or more implementations of the disclosure relate to detecting a user and an object (e.g., shopping cart, gear bag, luggage, etc.) moving toward a vehicle of the user, and automatically opening one or more closures of the vehicle based on the detecting. As described in further detail below, aspects of the subject technology may utilize an electronic control unit (ECU) and/or other processing circuitry of a vehicle to analyze images captured by an image sensor of the vehicle. The ECU may be triggered to perform the analysis when an authorization device of a user (e.g., a key fob, wristband, authorized mobile device, etc.) is detected within a proximity of the vehicle. The ECU of the vehicle may analyze the captured images to identify the user associated with the authorization device and any objects that are moving with the user toward the vehicle. If an object is detected as moving with the user toward the vehicle, the ECU may determine an appropriate closure of the vehicle to open and may cause an actuation of the determined closure, as described in further detail below.

In accordance with one or more aspects of the disclosure, a method is provided that includes detecting, by a processor, an authorized user within a proximity of a vehicle; detecting, by the processor, an object within a proximity of the authorized user; and causing, by the processor, an actuation associated with a closure of the vehicle based at least in part on the detected authorized user and the detected object. The authorized user may be detected based at least in part on the detection of an authorization device corresponding to the authorized user, where the authorization device is separate and distinct from the detected object.

In accordance with one or more aspects of the disclosure, a semiconductor device is provided that includes circuitry configured to detect, via a first sensor, an authorized user approaching a vehicle; detect, via a second sensor, an object approaching the vehicle coincident with the authorized user approaching the vehicle, the second sensor being a different type of sensor than the first sensor; and cause an actuation associated with a closure of the vehicle based at least in part on the detected authorized user and the detected object.

In accordance with one or more aspects of the disclosure, a non-transitory machine-readable medium is provided that stores instructions that, when executed by one or more processors, cause the one or more processors to perform operations including: detecting that an authorization device corresponding to an authorized user is approaching a vehicle; detecting that an object is approaching the vehicle in association with the authorization device approaching the vehicle, the object being separate from the authorization device; and in response to detecting that the object is approaching the vehicle in association with the authorization device approaching the vehicle, causing an actuation of one or more closures of the vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Vehicles include one or more spaces for holding passengers and/or cargo. Such spaces may include the cabin, trunk, frunk, and the like, and may be defined by one or more walls and/or one or more closures for access. Typically, the opening and closing of closures depends on manual operation by a user, such as disengaging and reengaging a latch of a closure. In some approaches, the manual operation of a closure may be made simpler for the user by performing the manual operation with an electronic device, such as an actuator and/or motor. For example, the user may press a button that causes an actuator to disengage a latch of a closure. However, the foregoing approaches still rely on the user physically interacting with a vehicle component (e.g., a button, a key fob, or the like), to cause the opening and closing of a particular selected closure.

Implementations of the subject technology described herein provide for automatic actuation (e.g., opening or closing) of vehicle closures (e.g., trunk/frunk, side doors, gear tunnel door, etc.) based at least in part on object recognition. For example, an ECU of a vehicle may be triggered to analyze images captured by an image sensor of the vehicle when an authorization device (e.g., key fob, bracelet, authorized mobile device, etc.) is detected within a proximity of the vehicle. The ECU of the vehicle may analyze the captured images to identify a user associated with the authorization device (e.g., the driver) and any objects the user may be moving with (e.g., holding, pushing) toward the vehicle. If the user is moving with an object toward the vehicle (and/or in association with an object toward the vehicle), the ECU may determine an appropriate vehicle closure to open and may then cause the determined vehicle closure to open.

In one or more implementations, the subject system determines an appropriate closure for actuation based on one or more factors, such as the detection of a particular object moving with the user toward the vehicle (e.g., a set of golf clubs, a grocery cart, etc.), and/or based on historical user closure actuation data. For example, if a user is detected as moving toward the vehicle in association with an object detected as a set of golf clubs, the subject system may determine that a gear door of the vehicle is the appropriate closure for actuation. Similarly, if the user is detected as moving toward the vehicle in association with an object detected as a grocery cart, and historically the user actuates the rear closure of the vehicle when approaching with a grocery cart, the subject system may determine that the rear closure is the appropriate closure for actuation.

In one or more implementations, the subject system may dynamically actuate (e.g., raise and/or lower) the suspension of the vehicle based on one or more factors, such as the detection of a heavy and/or large object moving with the user towards the vehicle, and/or historical user suspension actuation data. For example, if a user is detected as moving towards the vehicle in association with an object having at least a threshold size (and/or a detected object known to have at least a threshold weight), the subject system may determine an appropriate closure for actuation (such as the rear closure), and may also determine an appropriate level to lower the front and/or rear suspension (e.g., at or below the level at which a user may be carrying the detected object) to assist the user with loading the object into the determined closure.

Accordingly, the subject system enables automatic handsfree opening of an appropriate vehicle closure (and/or automatic adjustment of the suspension level) as an authorized user is approaching the vehicle with an object (and may or may not have a free hand), such that the appropriate vehicle closure is open, and/or at the appropriate level, for loading the object into the vehicle when the user reaches the vehicle. In addition, the subject system enables the automatic selection of the appropriate closure for actuation as the user approaches the vehicle. In this manner, the user can load the object into the appropriate closure of the vehicle immediately upon reaching the vehicle and without having to select the appropriate closure for actuation and/or without having to cause the actuation of the appropriate closure.

Figure 1:
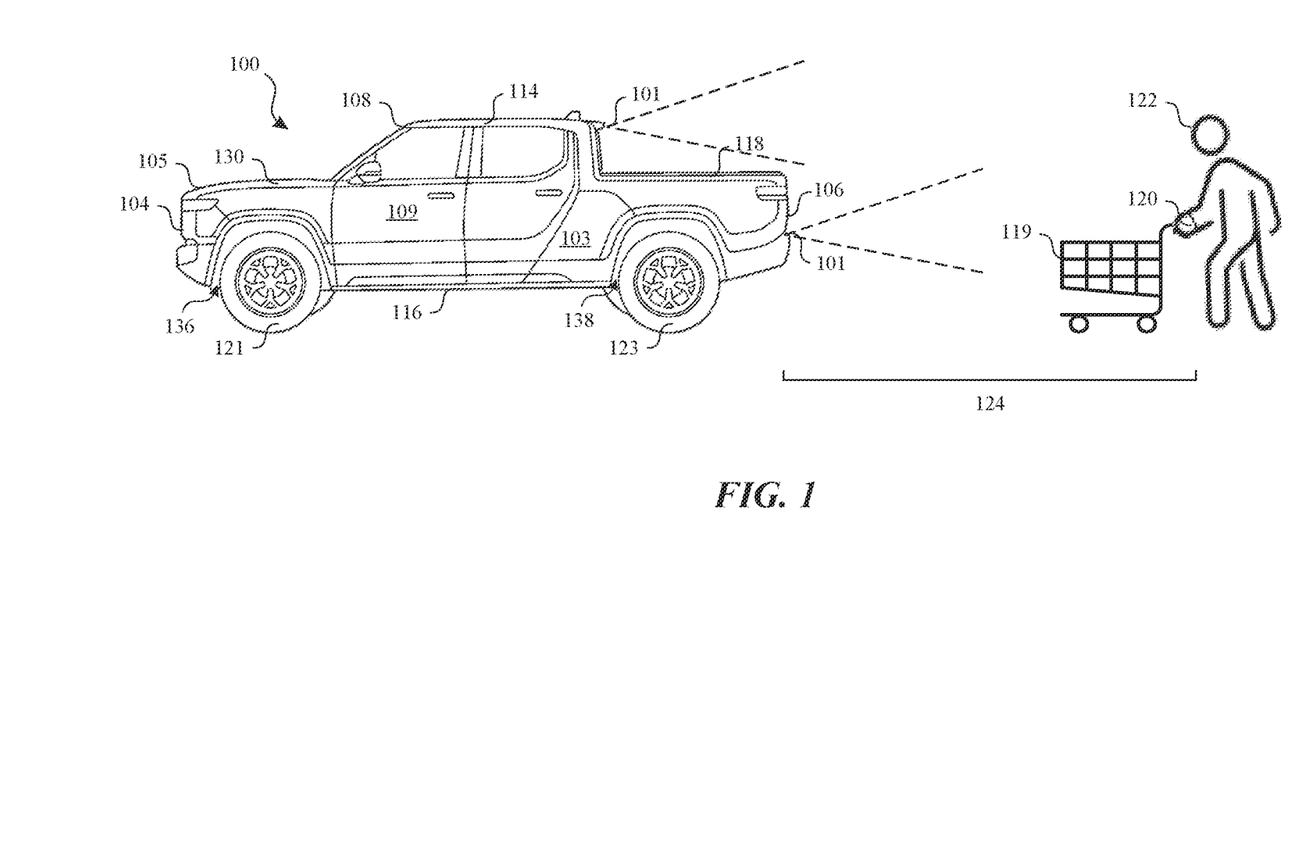
FIG. 1 illustrates an example vehicle in an environment including a user and an object approaching the vehicle in accordance with one or more implementations of the subject technology.

FIG. 1 illustrates an example vehicle 100 in an environment including a user 122 and an object 119 approaching the vehicle 100 in accordance with one or more implementations of the subject technology. Not all of the depicted components may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 1, the vehicle 100 may have a front portion 104 and a rear portion 106. A cabin 108 may be located between the front portion 104 and the rear portion 106 of the vehicle 100. The cabin 108 may include entry closures, such as doors 109. There may be one, two, three, four, or five or more entry closures to the cabin 108, which may contain, for example, one or more rows of seating for human occupants. The vehicle 100 may further include a left side and right side (not shown). The left side may be referred to as a driver side of the vehicle 100, and the right side may be referred to as a passenger side of the vehicle 100 in one or more implementations. In cases where the vehicle 100 is an autonomous vehicle that does not require or is not configured for a human driver, the left side of the vehicle 100 may still be referred to as a driver side as a matter of convenience. One or more of the entry closures may be located on the left side of the vehicle 100, and one or more of the entry closures may be located on the right side of the vehicle 100.

The vehicle 100 may include a roof 114, which may include racks or other equipment for storage (not shown). In one or more implementations, the roof 114 may include a roof closure (not shown), such as a sunroof, a moonroof, or the like. The vehicle 100 may further include a chassis and/or unibody 116. In one or more implementations, the vehicle 100 may include a rear closure 118 that provides access to a rear cargo space, such as a cargo bed or truck bed (also referred to herein as a "trunk"), and/or a front closure 130 that provides access to a front cargo space (also referred to herein as a front trunk or a "frunk"). The cargo bed may be typically located at or near the rear portion 106 of the vehicle 100.

The vehicle 100 may further include one or more front wheels 121 and one or more rear wheels 123. As shown, the front wheels 121 may each be partially disposed in a wheel well 136 of a body 105 of the vehicle 100. The rear wheels 123 may each be partially disposed in a wheel well 138 of the body 105. In one or more implementations, the vehicle 100 may be a unibody truck, which may, for example, include a storage bed.

In one or more implementations, one or more portions of the body 105 of the vehicle 100 may be constructed of steel alloy and/or aluminum alloy or other suitable materials. The vehicle 100 may also include one or more image sensors 101. The image sensors 101 may be positioned at different locations on the vehicle 100 to capture images of different areas surrounding the vehicle 100, different fields of view, and the like.

The vehicle 100 may include one or more spaces that may be used to transport people and/or objects, and the spaces may be defined at least in part by one or more closures. The closures of the vehicle 100 may be opened or closed when accessing the space corresponding to the closure. Such spaces may include, for example, the cabin 108, the rear cargo space, the front cargo space, and/or the gear tunnel. The cabin 108 may be defined at least in part by the body 105 of the vehicle 100 and the corresponding cabin closures may include the entry closures (e.g., doors 109). The rear cargo space may be defined at least in part by the body 105 of the vehicle 100 and the corresponding closures may include a cover and/or the rear closure 118. The front cargo space may be defined at least in part by the body 105 of the vehicle 100 and the corresponding closure may include the front closure 130. The gear tunnel may also be defined at least in part by the body of the vehicle 100 and the corresponding closure may include the gear tunnel closure 103. In one or more implementations, the gear tunnel may be physically separated from the rear cargo space.

For explanatory purposes, the vehicle 100 is illustrated in FIG. 1 as a truck. However, the vehicle 100 is not limited to a truck and may also be, for example, a sport utility vehicle, a van, a delivery van, a semi-truck, an aircraft, a watercraft, a car, a motorcycle, or generally any type of vehicle or other moveable apparatus.

Also depicted in FIG. 1 is a user 122. The user 122 may be a driver, passenger, or other user of the vehicle 100. The user 122 may be associated with the vehicle 100 as an authorized user of the vehicle 100. In one or more implementations, an authorized user may be a user that is granted permissions to access the vehicle 100 that an unauthorized user may not have. For example, an authorized user may be able to unlock the door 109 (e.g., using the authentication device 120), but an unauthorized user may not.

In one or more implementations, the user 122 may have registered the vehicle 100 to their user account via a cloud service provider, such as provided by the manufacturer of the vehicle, and/or the user 122 may have registered one or more user-specific identifiers (e.g., biometric identifiers, user identifiers, etc.) directly with the vehicle 100. The user 122 may also have registered and/or associated an authentication device 120 with the vehicle 100, such as via the cloud service provider and/or directly with the vehicle 100. The authentication device 120 is illustrated in FIG. 1 as a wristband or watch; however, the authentication device 120 may also be a mobile device or generally any device that is capable of communicating/authenticating with the vehicle 100.

As another example, image(s) of the face of the user 122 may be enrolled and stored locally at the vehicle 100 and the image sensors 101 of the vehicle 100 may capture images of the user's face that may be used to identify and authorize the user 122, such as by comparing the captured images with the stored image(s).

In the scenario depicted in FIG. 1, the user 122 is approaching the rear closure 118 of the vehicle 100. The user 122 may be approaching the vehicle 100 with an object 119, such as a shopping cart. Rather than waiting for the user 122 to manually actuate the rear closure 118, the vehicle 100 may automatically actuate the rear closure 118 in response to detecting that the user 122 is an authorized user of the vehicle 100 and that the user 122 is approaching the vehicle 100 with the object 119. The object 119 may be determined as approaching the vehicle 100 with the user 122 when the object is detected as being within a proximity of the user 122, in contact with the user 122, moving alongside the user 122, and/or is otherwise determined to be approaching the vehicle 100 coincident with the user 122 approaching the vehicle 100.

In one or more implementations, one or more of the image sensors 101 of the vehicle 100 may periodically capture one or more images, and the vehicle 100 may analyze the images (e.g., via facial recognition) to determine whether an authorized user (e.g., user 122) is visible in the images. The vehicle 100 may also analyze the images (e.g., via object recognition) to determine whether an object 119 is detected as approaching the vehicle 100 in association with the user 122. If the user 122 and the object 119 are detected by the vehicle 100, the vehicle 100 may automatically open a closure responsive to the detection.

Additionally or alternatively, the user 122 may be carrying (e.g., wearing, storing, or holding) an authentication device 120, such as a bracelet, key fob, authorized mobile device, and the like. The authentication device 120 may wirelessly emit authentication information corresponding to the user 122 (e.g., an authentication token and/or any cryptographic information that may be used to authenticate the user 122) that, when received and authenticated by the vehicle 100, causes an image sensor 101 of the vehicle 100 to activate and detect the object 119 approaching the vehicle 100 in association with the user 122, and/or detect/recognize the face of the user 122. When the vehicle 100 determines that the object 119 is approaching the vehicle 100 in association with the user 122, and/or the vehicle 100 recognizes the face of the user 122 as corresponding to an authorized user, the vehicle 100 may automatically open a closure, such as the rear closure 118.

In one or more implementations, the vehicle 100 may wait until the user 122 is within a proximity 124 of the vehicle 100 before automatically opening a closure. The proximity 124 may be a predetermined distance, such as a distance configured by the user 122 and/or a manufacturer of the vehicle 100, and/or the proximity 124 may be dynamic. For example, the proximity 124 may be the distance from which the authentication device 120 can be detected by the vehicle 100. As another example, the proximity 124 may be based on the speed at which the user 122 is approaching the vehicle 100 so that the closure will be fully open as the user 122 arrives at the vehicle 100. In one or more implementations, the closure may be opened using a variable opening speed to account for increases and/or decreases in the speed at which the user 122 is approaching the vehicle 100.

In one or more implementations, the vehicle 100 may include an adjustable front and/or rear suspension, such that the front or rear suspension can be actuated to raise and/or lower the body of the vehicle 100. In one or more implementations, the suspension may further be actuatable on a per wheel basis. Thus, if the vehicle detects that the user 122 is approaching the vehicle 100 with an object 119 detected (e.g., using computer vision) as having at least a threshold size, and/or with an object 119 that is detected/recognized/classified as a known object having at least a threshold weight, the vehicle 100 may raise or lower the suspension to a vehicle level that facilitates loading the object 119 into the determined closure of the vehicle 100. For example, if the user 122 is carrying the object 119, the vehicle 100 may adjust the suspension so that the level of the lower portion of the determined closure is at the substantially same level at which the user is carrying the object (or slightly above and/or below that level). Alternatively and/or in addition, if the user 122 is pulling or pushing the object 119, the vehicle 100 may lower the suspension to the lowest vehicle level.

In one or more implementations, actuating the suspension may include, for example, adjusting the suspension of the entire vehicle 100 (e.g., at each wheel) and/or at portions of the vehicle 100 based on the location of the determined closure. For example, the vehicle 100 may lower the rear suspension of the vehicle (e.g., via a vehicle dynamics module) upon detecting a user approaching the rear closure (e.g., a trunk) with one or more large objects (e.g., lumber) or lower the front of the vehicle upon detecting a user approaching the front closure (e.g., a frunk) with one or more large objects (e.g., an ice chest or cooler). In addition, and/or alternatively, adjusting the suspension may be based on the position of the vehicle 100 relative to the terrain. For example, the vehicle 100 may lower the suspension and further adjust the suspension to make a surface of a vehicle (e.g., a space corresponding to the determined closure, such as a trunk) level with the terrain beneath the vehicle.

Example components of a vehicle 100 that is configured to perform automatic closure actuation based on object detection are discussed further below with respect to FIG. 2. An example process flow for automatic closure actuation based on object detection is discussed further below with respect to FIG. 3, and an example process for automatic closure actuation based on object detection is discussed further below with respect to FIG. 4.

Figure 2:
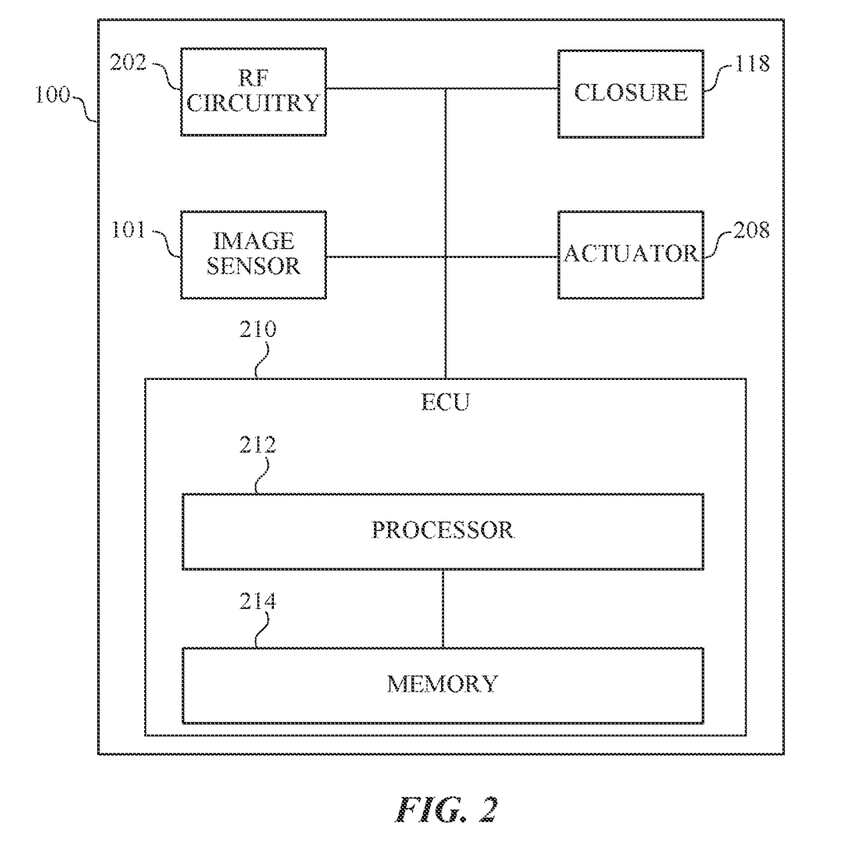
FIG. 2 illustrates a block diagram of an example vehicle configured to perform automatic closure actuation based on object detection in accordance with one or more implementations of the subject technology.

FIG. 2 illustrates a block diagram of an example vehicle 100 configured to perform automatic closure actuation based on object detection in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The vehicle 100 may include one or more ECUs 210, radio frequency (RF) circuitry 202, one or more image sensors 101, one or more closures 118, and one or more actuators 208. The ECU 210 may include a processor 212 and a memory 214. In one or more implementations, the vehicle 100 may include a processor 212 and/or a memory 214 separate from the ECU 210. For example, the vehicle 100 may not include the ECU 210 and may include the processor 212 as a part or all of a separate semiconductor device. In one or more implementations, vehicle 100 may include multiple ECUs 210 that each control particular functionality of the vehicle 100.

The processor 212 may include suitable logic, circuitry, and/or code that enables processing data and/or controlling operations of the vehicle 100. In this regard, the processor 212 may be enabled to provide control signals to various other components of the vehicle 100, such as for example, the actuator 208 and/or the rear closure 118. The processor 212 may also control transfers of data between various portions of the vehicle 100. The processor 212 may further implement an operating system, such as a real-time operating system, or may otherwise execute code to manage operations of the vehicle 100.

The memory 214 may include suitable logic, circuitry, and/or code that enable storage of various types of information such as received data, machine learning model data (such as for computer vision and/or other user/object detection algorithms), user authentication data, and/or configuration information. The memory 214 may include, for example, random access memory (RAM), read-only memory (ROM), flash, and/or magnetic storage. In one or more implementations, the memory 214 may store identifiers and/or authentication information of one or more users to determine authorized users and/or authorized authentication devices of the vehicle 100. Identifiers may include numbers, phrases, images, videos, or any other data or cryptographic information that can be associated with a user 122 and/or an authentication device 120. The memory 214 may also store account information corresponding to an authorized user for exchanging information between the vehicle 100 and a remote server.

The image sensor 101 may be included in one or more cameras, such as an onboard camera, dashcam, event camera, infrared camera, video camera, or any other type of device that captures digital representations of a physical environment. The cameras may be used to capture images for detecting and/or recognizing people and/or objects. For example, images captured by the image sensor 101 may be input into a trained facial recognition model for identifying a person, which may be compared to, for example, a database of facial data stored in the memory 214.

The RF circuitry 202 may include suitable logic, circuitry, and/or code that enables wired or wireless communication, such as locally between the vehicle 100 and an authentication device 120, and/or between the vehicle 100 and one or more remote servers or devices. The RF circuitry 202 may include, for example, one or more of an ultra-wideband interface, a Bluetooth communication interface, an NFC interface, a Zigbee communication interface, a WLAN communication interface, a USB communication interface, a cellular interface, or generally any interface for transmitting and/or receiving electronic communications.

The actuator 208 may include one or more devices for moving and/or controlling a mechanism, such as the rear closure 118. The actuator 208 may be one or more types of actuators such as an electric, magnetic, mechanical, or any other type of actuator. In one or more implementations, one or more actuators may correspond to one or more closures (e.g., one actuator per closure). The actuator 208 may receive a signal from the ECU 210 (e.g., from the processor 212 of the ECU 210), such as a signal to open or close a particular rear closure 118.

The rear closure 118 may include one or more handles, buttons, or other actuation mechanisms, and may be opened and closed by an actuator 208 and/or by manual operation from a user. The rear closure 118 may open and close at one or more fixed speeds and/or based on an acceleration curve (e.g., a rear closure 118 may initially open faster than when it continues to open, and the like). The vehicle 100 may include other closures such as door 109 and/or gear tunnel closure 103.

In one or more implementations, one or more of the processor 212, the memory 214, the image sensor 101, the RF circuitry 202, the ECU 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

Figure 3:
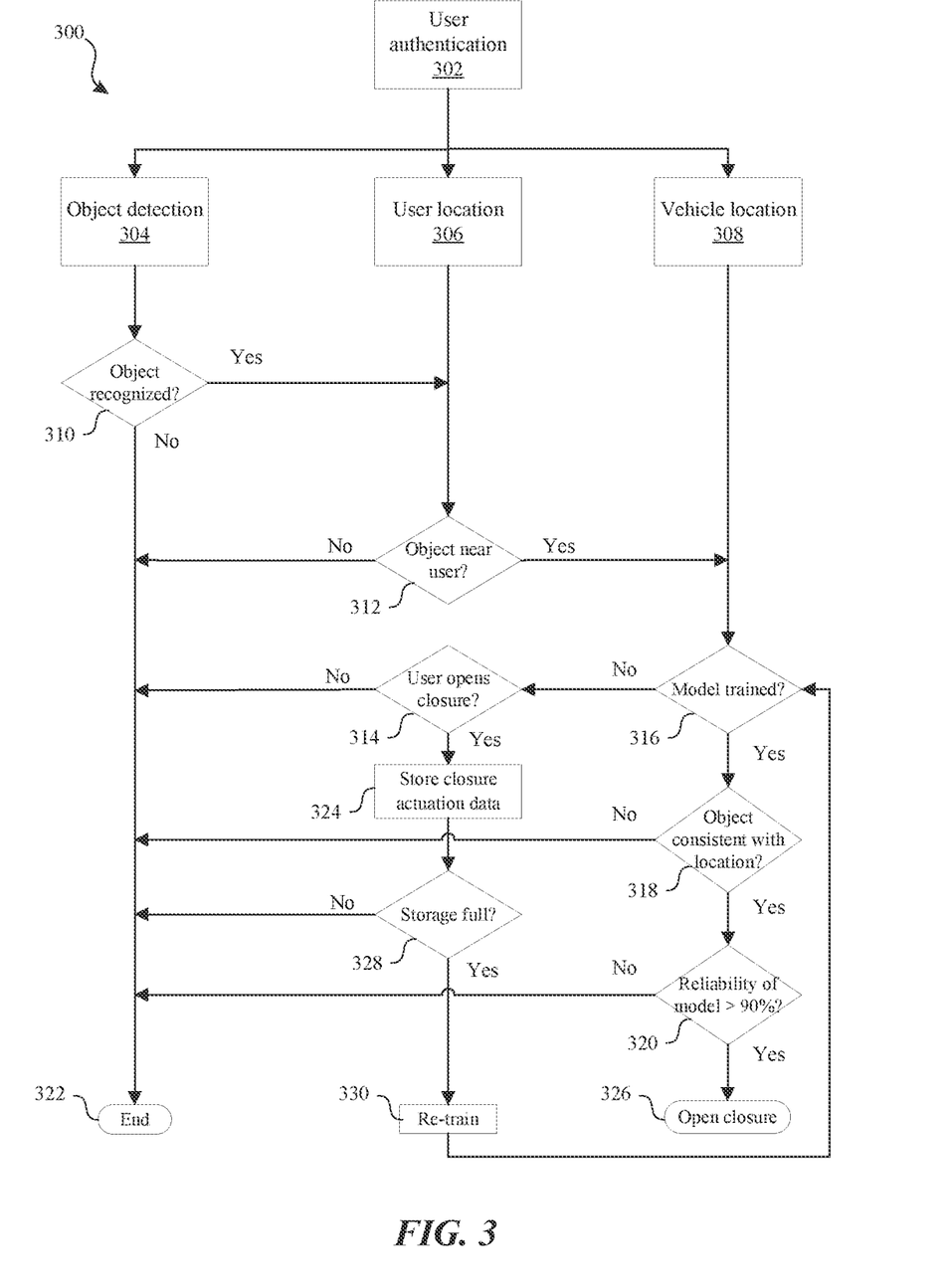
FIG. 3 illustrates a flow diagram of an example process flow for automatic closure actuation based on object detection in accordance with one or more implementations of the subject technology.

FIG. 3 illustrates a flow diagram of an example process flow 300 for automatic closure actuation based on object detection in accordance with one or more implementations of the subject technology. For explanatory purposes, the process flow 300 is primarily described herein with reference to components of the vehicle 100 of FIGS. 1 and 2. However, the process flow 300 is not limited to the vehicle 100, and one or more blocks (or operations) of the process flow 300 may be performed by one or more other components of other suitable apparatuses, devices, or systems. Further for explanatory purposes, some of the blocks of the process flow 300 are described herein as occurring in serial, or linearly. However, multiple blocks of the process flow 300 may occur in parallel. In addition, the blocks of the process flow 300 need not be performed in the order shown and/or one or more blocks of the process flow 300 need not be performed and/or can be replaced by other operations. Further for explanatory purposes, the process flow 300 is described as utilizing one or more machine learning models, such as one or more neural networks. However, the process flow 300 is not limited to utilizing a machine learning model and can also be performed using heuristics, a rules-based approach, or generally any approach.

At block 302, a user (e.g., the user 122) may be authenticated by the vehicle 100, such as via the ECU 210 and/or processor 212 of the vehicle 100. The authentication may be performed to determine whether the user is authorized to access and/or operate the vehicle 100. For example, the vehicle 100 may be configured such that only an authorized user may start the vehicle and the vehicle may automatically open closures only for authorized users.

Authentication may be performed by way of authentication information (e.g., a unique set of letters and/or numbers and/or other cryptographic information) associated with one or more users. For example, the RF circuitry 202 of the vehicle 100 may listen for and receive authentication information from an authentication device 120 of the user 122. The RF circuitry 202 may provide the received authentication information to the processor 212 which may compare the authentication information to authentication information stored in the memory 214 of the vehicle 100 to determine if the authentication device 120 corresponds to an authorized user. In one or more implementations, authentication may be performed locally and/or remotely by one or more computer vision models that may be used to recognize a face of an authorized user. In one or more implementations, authentication may be performed when the user is at or within a proximity (e.g., the proximity 124) of the vehicle.

If the user is authenticated as an authorized user at block 302, the vehicle 100 (e.g., via the ECU 210) may determine whether to actuate a closure based on object detection performed at block 304, user location determination performed at block 306 and/or vehicle location performed at block 308.

At block 304, the vehicle 100 may determine whether an object is detected proximate to the vehicle, such as by activating one or more image sensors 101 to capture images of the environment proximate to the vehicle 100. The ECU 210 and/or processor 212 of the vehicle 100 may analyze one or more captured images, such as using a computer vision model, to determine whether there is a recognized object in the captured images (e.g., object 119). A computer vision model may be trained using images of recognized objects to receive an image as input and output a recognized object contained within the image. For example, a computer vision model may be trained to detect and/or classify an object as a shopping cart, a golf bag, a suitcase, a stroller, a surfboard, a bicycle, a wheelchair, a child, or generally any object.

At block 306, the vehicle 100 (e.g., via the ECU 210 and/or the processor 212) may determine a location of the authorized user, such as relative to the vehicle 100 and/or relative to the detected object 119. In one or more implementations, the user location relative to the vehicle 100 may be determined based on the position on the vehicle 100 of the image sensor 101 that captured an image from which the user was detected by a machine learning model, such as a computer vision model. For example, if a rear camera captured an image from which the user was detected, then the ECU 210 and/or the processor 212 may determine that the user is located behind the vehicle 100. The user location may also or instead be determined based on an angle of arrival associated with the authentication information received from the authentication device 120 of the user 122. In one or more implementations, the user location may be determined based on one or more ranging operations performed between the authentication device 120 and the RF circuitry 202 of the vehicle 100, such as by using ultra-wideband communications.

At block 308, the vehicle 100 may determine its location, such as relative to the user 122, the object 119, and/or a global location. In one or more implementations, the vehicle 100 may include a positioning system, such as a global positioning system (GPS), from which the location of the vehicle 100 may be determined. Other mechanisms for determining location may be based on a network signal (e.g., a Wi-Fi signal), an RFID signal, and/or any other signal associated with a geographic location.

At block 310, the vehicle 100, such as via the ECU 210 and/or the processor 212, may determine whether the detected object is a recognized and/or classified object. As previously discussed, recognized objects include, but are not limited to, shopping carts, grocery bags, golf clubs, luggage, and/or generally any object that can be recognized via a computer vision model or other technology. In one or more implementations, a recognized object is not limited to any object in particular but may be any non-human subject, such as a pet, and/or a human subject, such as a baby or a child. In one or more implementations, the recognition and/or classification of the object may be determined to select a closure of a space of the vehicle 100 that supports the class of the detected object. If a recognized object is not detected, the process flow 300 may end at block 322. Otherwise, the process flow 300 continues to block 312.

At block 312, the vehicle 100 (e.g., via the ECU 210 and/or the processor 212) may determine whether the recognized object is near the authorized user. An object may be determined to be near the authorized user if the object is within a predetermined distance from the authorized user. Determining whether the object and the user are within the predetermined distance may be estimated based on image characteristics, such as the number of pixels between the object and the user. In one or more implementations, determining whether the object and the user are within the predetermined distance may also or instead be estimated based on differences between images captured within a predetermined period of time. For example, two or more images may be captured from the same camera within a period of five seconds, and the object may be considered near to the user if the object moves along with the user between the captured images. If a recognized object is determined to not be near the authorized user at block 312, the process flow 300 may end at block 322. Otherwise, the process flow 300 continues to block 316.

In one or more implementations, blocks 304, 310, and/or 312 may be performed by a machine learning model, such as a computer vision model, trained to jointly detect an authorized user and an object. For example, the computer vision model used to detect an authorized user (as described with respect to block 306) and the computer vision model used to detect an object (as described with respect to block 304) may be combined into a single computer vision model that detects both an authorized user and an object near the authorized user (e.g., thereby also performing the operation described with respect to block 312). For example, the combined computer vision model may jointly detect an authorized user pushing a shopping cart toward the vehicle.

At block 316, the vehicle 100 (e.g., via the ECU 210 and/or the processor 212) determines whether a machine learning model has been trained for an authorized user (as opposed to being a base machine learning model trained based on a general population of users an expected general population of users). A machine learning model may be trained for an authorized user if it has been re-trained, fine-tuned, or otherwise reconfigured from a base machine learning model based on a set of user-specific closure actuation data. If the machine learning model is not trained for the authorized user, the process flow 300 may move to block 314. Otherwise, the process flow 300 may move to block 318.

In one or more implementations, one or more machine learning models may be used to determine whether to open one or more closures. For example, a machine learning model may be trained with data specific to the authorized user (e.g., user-specific data). User-specific data may include, for example, specific locations the user has traveled to, objects that have been near the user, which closures were previously opened by the user for a particular class (e.g., shape, size, or purpose) of an object, and/or any other value relating to recognized objects, user locations, and/or vehicle locations.

For example, a machine learning model can be associated with map data and may be biased to provide an output that causes a particular closure (such as a liftgate) to be actuated when an authorized user is detected with an object near a particular location (such as a supermarket). Initially, the model may provide an output that causes the liftgate to be open for any supermarket that the authorized user is detected with an object near; however, over time the subject system may record data indicating which particular supermarkets the authorized user frequents and, after re-training the model, the model may provide an output that is more heavily weighted toward actuating the liftgate when the authorized user is detected with an object near a supermarket that the authorized user frequents (e.g., as opposed to other supermarkets).

Alternatively, or in addition, a machine learning model may be biased to provide an output that causes a particular closure to be actuated based on a detected size and/or aspect ratio of a detected object. For example, a gear tunnel door may be actuated when longer objects like a golf bar are detected. However, over time the subject system may record geographical data regarding when particular closures are actuated (e.g., a gear tunnel door being actuated when the vehicle is at a golf course), and, after re-training the model, the model may provide an output that is more heavily weighted toward actuating the gear tunnel door when the authorized user is detected with a long object near a golf course.

In one or more implementations, the amount of training data used to train a machine learning model may affect the machine learning model's level of reliability. When more training data is used to train a machine learning model, the machine learning model may be able to output predictions with higher degrees of certainty and/or reliability. For example, as an authorized user begins using the vehicle, weights of the machine learning model change as the machine learning model is re-trained based on the closure actuation data corresponding to the user's use of the vehicle 100. The machine learning model may become reliable at predicting which closure the user may intend to open to load, for example, a suitcase or golf clubs into the vehicle 100.

In one or more implementations, the machine learning model may be re-trained directly at the vehicle 100 (e.g., via the ECU 210 and/or the processor 212). Alternatively, or in addition, the vehicle 100 may provide collected data to another computing device, such as a mobile device of the user and/or a server, to perform the model re-training. In either instance, the collection and processing of the data may be handled in accordance with user privacy best practices.

At block 314, if the machine learning model described at block 316 has not been trained for the authorized user (e.g., using user-specific closure actuation data), then the closure may not be automatically opened and instead the user may manually open a closure (e.g., by physically pulling a handle or pressing a button). If the user does not open a closure at block 314, then the process flow 300 may end at block 322.

At block 324, when the user opens a closure, the vehicle 100 (e.g., via the ECU 210 and/or the processor 212) may generate closure actuation data for subsequent training or re-training of a machine learning model for predicting closure actuation. The data may include user-specific closure actuation data such as the location where the closure was opened, the object the user was approaching the vehicle with, and the like. The data may be stored with other training data for training and/or re-training (e.g., tuning, reinforcing, and the like) the machine learning model.

At block 328, if the storage (e.g., the storage that includes the training data) is full, the process flow 300 may proceed to block 330. Otherwise, the process flow 300 may end at block 322. In one or more implementations, the storage (e.g., a buffer, volume, data structure, etc.) may be a predetermined size for storing a predetermined amount of user-specific closure actuation data (e.g., an amount sufficient to re-train a machine learning model, such as a base machine learning model). In one or more implementations, each authorized user may have a separate storage space for their respective user-specific closure actuation data.

At block 330, a machine learning model may be re-trained based on new user-specific closure actuation data. For example, the vehicle 100 may initially include, such as at the time of manufacture and/or for a new authorized user, a base machine learning model that may be trained, for example, using closure actuation data corresponding to a general population of users, locations, and objects. After the vehicle 100 has accumulated a threshold amount of user-specific closure actuation data relating to when and where an authorized user actuated a particular closure and/or what object or class of object was placed in and/or removed from the vehicle via the particular closure, the machine learning model may be re-trained and/or refined using the user-specific closure actuation data.

If the model described at block 316 is determined to be trained for the authorized user, then the process flow 300 proceeds to block 318 where the vehicle 100 (e.g., via the ECU 210 and/or the processor 212) determines whether the recognized object is consistent with the location of the vehicle 100. For example, to reduce the rate of false positives that may cause a closure to open when it should not have, the vehicle 100 may not automatically open a closure unless the closure has been previously opened at the current vehicle location for the class of recognized object where the class may include a size, shape, category, purpose, or any other identifying characteristic of an object. If the recognized object has not previously been detected at the location of the vehicle 100, the process flow 300 may end at block 322. Otherwise, the process flow 300 proceeds to block 320.

At block 320, the vehicle 100 (e.g., via the ECU 210 and/or the processor 212) determines whether the reliability of the closure actuation prediction provided by the machine learning model satisfies a reliability threshold, in which case the predicted closure is opened at block 326. In one or more implementations, the reliability of the closure actuation prediction of the machine learning model may be determined based on the confidence value, or likelihood value, output by the machine learning model in conjunction with the predicted closure for actuation. If the confidence value is below a predetermined threshold, such as 0.9, or generally any threshold, the prediction of the machine learning model may be determined to be unreliable for purposes of actuating the predicted closure and the process flow 300 ends at block 322.

Figure 4:
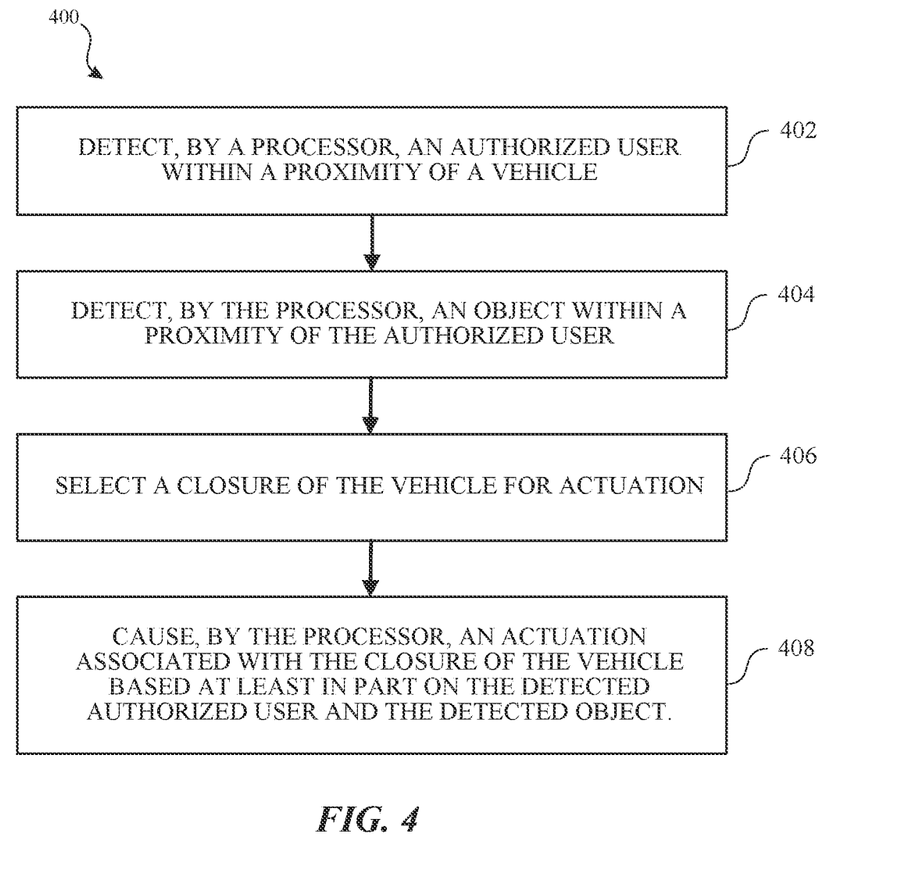
FIG. 4 illustrates a flow diagram of an example process for automatic closure actuation based on object detection in accordance with one or more implementations of the subject technology.

FIG. 4 illustrates a flow diagram of an example process 400 for automatic closure actuation based on object detection in accordance with one or more implementations of the subject technology. For explanatory purposes, the process 400 is primarily described herein with reference to the vehicle 100 of FIGS. 1 and 2, and/or various components thereof. However, the process 400 is not limited to the vehicle 100 of FIG. 1, and one or more blocks (or operations) of the process 400 may be performed by one or more other structural components of the vehicle 100 and/or of other suitable moveable apparatuses, devices, or systems. Further, for explanatory purposes, some of the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, the vehicle 100 may detect, by a processor (e.g., the processor 212), an authorized user (e.g., the user 122) within a proximity (e.g., the proximity 124) of the vehicle 100. The user may be an authorized user if the user can be authenticated by the vehicle 100 (e.g., via the processor 212). For example, a user may wear an authentication device (e.g., the authentication device 120) that emits a signal that includes authentication information that the vehicle 100 can receive (e.g., by a sensor such as the RF circuitry 202) and the ECU 210 and/or the processor 212 can authenticate the authentication information to verify that the user is authorized to interact with the vehicle 100.

The proximity of the vehicle 100 may be a predetermined distance (e.g., 5 feet or 10 feet). In one or more implementations, the proximity may be in a particular direction from the vehicle (e.g., behind the vehicle). In one or more implementations, determining whether the user is within the proximity of the vehicle 100 may be based on the signal emitted from the authentication device 120. For example, the authentication device 120 may emit ultra-wideband ranging signals that allow the ECU 210 of the vehicle 100 (e.g., in conjunction with the RF circuitry 202) to obtain an accurate distance to the authentication device 120.

In one or more implementations, the vehicle 100 (e.g., via the ECU 210 and/or processor 212) may also determine the whether the authorized user is approaching the vehicle 100. For example, a closure may not be opened if the user is merely standing nearby the vehicle 100 but may be opened in the user is approaching the vehicle 100. In one or more implementations, detecting whether an authorized user is approaching the vehicle 100 may include using the RF circuitry 202 to detect that the authentication device 120 of the user 122 is approaching the vehicle 100, and correlating the detection of the authentication device 120 to a detection of the user approaching the vehicle 100 in one or more images captured by an image sensor 101 of the vehicle 100.

At block 404, the vehicle 100 may detect (e.g., via the ECU 210 and/or the processor 212), an object (e.g., the object 119) within a proximity of the authorized user. The vehicle 100 may detect the object with the same or different sensor used to detect the authenticated user. For example, the user and object may be detected by the image sensor 101 and/or the user can be detected by the RF circuitry 202 (e.g., via the authentication device 120), and the object can be detected by the image sensor 101.

In one or more implementations, when the authorized user is confirmed to be approaching the vehicle 100, the vehicle 100 may also determine whether the object is approaching the vehicle 100. For example, the ECU 210 and/or processor 212 of the vehicle 100 may detect an object approaching the vehicle based on one or more images captured by the image sensor 101. If the detected object is determined to be approaching the vehicle 100, the ECU 210 and/or processor 212 of the vehicle 100 may also correlate the movement of the object with the movement of the authorized user approaching the vehicle 100 to verify that the object is approaching the vehicle with the authorized user.

In one or more implementations, the ECU 210 and/or processor 212 of the vehicle 100 may also determine a classification of the detected object. The classification of the detected object may be performed using, for example, a machine learning model trained to classify objects. The classification may include shape, size, aspect ratio, purpose, or any other characteristics or groups and/or subsets thereof. The characteristics may also include a temperature requirement associated with the object. For example, the object may be a perishable good (e.g., a carton of milk), and the closure may correspond to a temperature-controlled space (e.g., the frunk of the vehicle).

At block 406, the ECU 210 and/or processor 212 of the vehicle 100 may select one or more closures (e.g., the door 109) of the vehicle for actuation. The selection may be based at least in part on a user preference, closure actuation history, historical behavior of the authorized user, a characteristic of the detected object, trajectory of the authorized user to the vehicle, and/or an environmental condition. In one or more implementations, the ECU 210 and/or processor 212 of the vehicle 100 may further determine an appropriate vehicle level for loading an object into the selected closure, such as based at least in part on a user preference, suspension actuation history, historical behavior of the authorized user, a characteristic of the detected object (e.g., size and/or weight), and/or the level of the terrain under the vehicle 100.

In one or more implementations, an authorized user may input user preferences into the vehicle 100, such as via a user interface included in the vehicle 100, and/or via a mobile application and/or web page. The user preferences may indicate which closure is set as a default closure for a particular object (e.g., a detected object) or type/class of object (e.g., objects of the same class as the detected object). User preferences may also include the circumstances in which a closure should automatically open. The circumstances may include a time of day. For example, the user may indicate that closures should not automatically open at night. The circumstances may also include a location. For example, the user may indicate that closures should only automatically open at a grocery store or at the user's home or other trusted locations. The circumstances may further include how a closure should open. For example, the user may indicate that the closure of the truck should open slower than the closure of a side door. Thus, the closure selected for actuation may be determined based at least in part based on the user preferences.

In one or more implementations, the closure actuation history may include a record of the closures that were actuated to retrieve an object from the vehicle 100 and/or place objects into the vehicle 100. The closure actuation history may also include a record of the closures that were actuated to place an object in the vehicle. The object may be the detected object or an object of the same class (e.g., size, shape, or function) as the detected object. Thus, the closure selected for actuation may be determined based at least in part on the closure that was previously actuated in association with the detected object.

In one or more implementations, the trajectory of the user may include determining the direction that the user is approaching the vehicle 100. The trajectory may be determined based on one or more images captured from an image sensor 101 of the vehicle 100 and tracking the user's position in the images over time. The trajectory may also or instead be determined based on the position of the user as determined based on the transmission received from the authentication device 120 of the user. Thus, the closure selected for actuation may be determined based at least in part on which closure the user is approaching based on the user's trajectory.

In one or more implementations, the environmental condition may include current and/or future weather conditions. The environmental condition may be determined by onboard sensors or retrieved from an external database that includes weather information corresponding to the vehicle's location. Thus, the closure selected for actuation may be based on the weather conditions, e.g., a closure may only be partially opened if it is raining.

In one or more implementations, the selection of one or more closures for actuation may be based on an output of a machine learning model trained to select a closure for actuation based at least in part on one or more of the aforementioned factors. For example, the vehicle 100 may initially be manufactured to include a base machine learning model that may be trained, for example, using closure actuation data corresponding to a general population of users, locations, and objects. After the vehicle 100 has accumulated a threshold amount of user-specific closure actuation data relating to when and where an authorized user actuated a particular closure and/or what object or class of object was placed in and/or removed from the vehicle via the particular closure, the machine learning model may be re-trained and/or refined using the user-specific closure actuation data. In one or more implementations, a machine learning model may be similarly trained using historical suspension actuation data to determine the appropriate vehicle level for loading a particular object into a particular closure.

At block 408, the vehicle 100 may cause an actuation of the selected closure. For example, the ECU 210 and/or the processor 212 may transmit a command and/or signal to the actuator 208 to actuate the rear closure 118.

In one or more implementations, the actuation may be based on the velocity of the user. For example, the ECU 210 and/or the processor 212 of the vehicle 100 may determine the velocity of the authorized user approaching the vehicle 100. The velocity may be determined, for example, based on one or more time series images captured from a camera of the vehicle 100 and the difference between the user's position between images. The velocity may be used to determine a time to cause the actuation of the closure so that the closure is opening or is opened when the authorized user arrives at the vehicle 100. The trajectory may also or instead be determined based on the position of the user as determined based on the authentication transmission received from the authentication device 120 of the user. The trajectory may be used to determine how to open the closure. For example, a closure may open from multiple sides and the side that the closure opens may depend on the trajectory of the authorized user approaching the vehicle 100.

In one or more implementations, the actuation may be based at least in part on the classification of the detected object. For example, the selected closure (e.g., from block 406) may be a two-way tailgate having an upper tailgate and a lower tailgate. If the classification of the detected object is a storage object (e.g., for loading groceries from the store into the vehicle), the upper tailgate may open while the lower tailgate remains closed to reduce unnecessary actuation of vehicle components.

In one or more implementations, the ECU 210 and/or the processor 212 of the vehicle 100 may predict whether the user is approaching the vehicle and intends to open the selected closure using a machine learning model. As previously discussed, the vehicle 100 may initially include a base machine learning model (e.g., stored in memory 214) for which the training data set may include closure actuation data corresponding to a general population of different users and/or different objects.

As the authorized user uses the vehicle 100, the vehicle 100 may collect user-specific closure actuation data relating to when and where the authorized user actuated a particular closure and/or what object or class of object was placed in and/or removed from the vehicle via the particular closure. For example, user-specific closure actuation data may include the time, location, recognized object, and/or selected closure labeled with an indication of whether a closure was actuated by the user. The base machine learning model may then be re-trained and/or refined using the collected user-specific closure actuation data and then may be used to predict a particular closure that the user intends to open based on one or more of the aforementioned input features (e.g., location, detected object, etc.), and may provide a likelihood associated therewith.

If the likelihood exceeds a threshold value (e.g., 90%), then the ECU 210 and/or the processor 212 of the vehicle 100 may cause the actuation of the predicted closure. After the actuation, the ECU 210 and/or processor 212 of the vehicle may store a new data point indicating whether the user actually intended for the selected closure to actuate, such as based on whether the image sensor 101 detected the user placing the detected object in the cargo space of the vehicle 100 enclosed by the actuated closure. In one or more implementations, a confirmation that the user intended for the closure to be actuated may be received via an affirmative confirmation from the user (e.g., a dashboard prompt for the user to indicate confirmation) and/or an inferred confirmation (e.g., a change in weight of the vehicle due to the detected object being placed in the vehicle). The new data may be added to the collected user-specific closure actuation data to subsequently re-train and/or refine the machine learning model for future actuation predictions.

Figure 5:
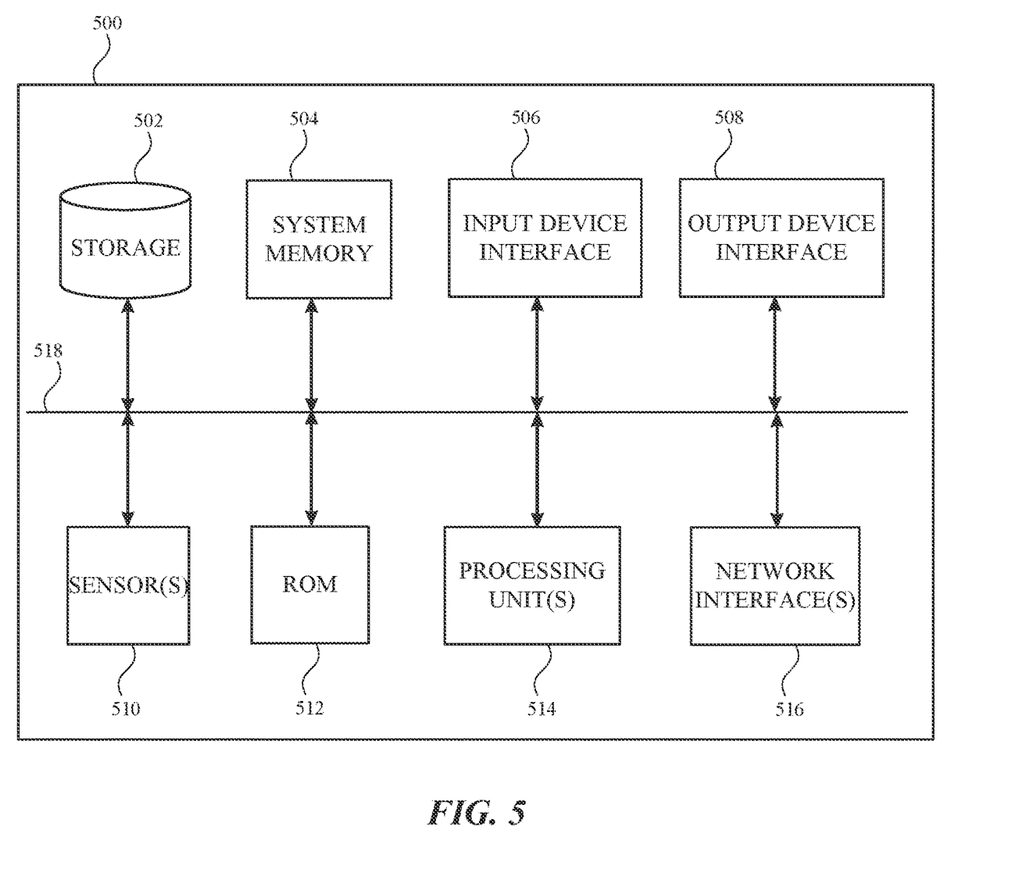
FIG. 5 illustrates an electronic system with which one or more implementations of the subject technology may be implemented.

FIG. 5 illustrates an example electronic system 500 with which aspects of the present disclosure may be implemented. The electronic system 500 can be, and/or can be a part of, any electronic device for providing the features and performing processes described in reference to FIGS. 1-4, including but not limited to a vehicle, computer, server, smartphone, and wearable device (e.g., authentication device). The electronic system 500 may include various types of computer-readable media and interfaces for various other types of computer-readable media. The electronic system 500 includes a persistent storage device 502, system memory 504 (and/or buffer), input device interface 506, output device interface 508, sensor(s) 510, ROM 512, processing unit(s) 514, network interface 516, bus 518, and/or subsets and variations thereof.

The bus 518 collectively represents all system, peripheral, and chipset buses that communicatively connect the numerous internal devices and/or components of the electronic system 500, such as any of the components of the vehicle 100 discussed above with respect to FIG. 2. In one or more implementations, the bus 518 communicatively connects the one or more processing unit(s) 514 with the ROM 512, the system memory 504, and the persistent storage device 502. From these various memory units, the one or more processing unit(s) 514 retrieves instructions to execute and data to process in order to execute the processes of the subject disclosure. The one or more processing unit(s) 514 can be a single processor or a multi-core processor in different implementations. In one or more implementations, one or more of the processing unit(s) 514 may be included on an ECU 210, such as in the form of the processor 212.

The ROM 512 stores static data and instructions that are needed by the one or more processing unit(s) 514 and other modules of the electronic system 500. The persistent storage device 502, on the other hand, may be a read-and-write memory device. The persistent storage device 502 may be a non-volatile memory unit that stores instructions and data even when the electronic system 500 is off. In one or more implementations, a mass-storage device (such as a magnetic or optical disk and its corresponding disk drive) may be used as the persistent storage device 502.

In one or more implementations, a removable storage device (such as a floppy disk, flash drive, and its corresponding disk drive) may be used as the persistent storage device 502. Like the persistent storage device 502, the system memory 504 may be a read-and-write memory device. However, unlike the persistent storage device 502, the system memory 504 may be a volatile read-and-write memory, such as RAM. The system memory 504 may store any of the instructions and data that one or more processing unit(s) 514 may need at runtime. In one or more implementations, the processes of the subject disclosure are stored in the system memory 504, the persistent storage device 502, and/or the ROM 512. From these various memory units, the one or more processing unit(s) 514 retrieves instructions to execute and data to process in order to execute the processes of one or more implementations.

The persistent storage device 502 and/or the system memory 504 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 518 also connects to the input device interfaces 506 and output device interfaces 508. The input device interface 506 enables a user to communicate information and select commands to the electronic system 500. Input devices that may be used with the input device interface 506 may include, for example, alphanumeric keyboards, touch screens, and pointing devices. The output device interface 508 may enable the electronic system 500 to communicate information to users. For example, the output device interface 508 may provide the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

The bus 518 also connects to sensor(s) 510. The sensor(s) 510 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 510 may be utilized to detect movement, travel, and orientation of the electronic system 500. For example, the sensor(s) may include an accelerometer, a rate gyroscope, and/or other motion-based sensor(s). The sensor(s) 510 may include one or more biometric sensors and/or image sensors for authenticating a user.

The bus 518 also couples the electronic system 500 to one or more networks and/or to one or more network nodes through the one or more network interface(s) 516. In this manner, the electronic system 500 can be a part of a network of computers (such as a local area network or a wide area network). Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   detecting, by a processor, an authorized user within a proximity of a vehicle;
   detecting, by the processor, an object within a proximity of the authorized user;
   determining, by the processor, a time to cause an actuation associated with a closure of the vehicle based at least in part on an approach of the authorized user to the vehicle; and
   causing, by the processor, the actuation associated with the closure of the vehicle based at least in part on the detected authorized user, the detected object, and the time to cause the actuation.

2. The method of claim 1, wherein the authorized user is detected using a first sensor and the object is detected using a second sensor that differs from the first sensor.

3. The method of claim 2, wherein the authorized user is detected based at least in part on detection of an authorization device corresponding to the authorized user, the authorization device being separate from the detected object.

4. The method of claim 1, wherein detecting, by the processor, that the authorized user is within the proximity of the vehicle comprises:
   determining that the authorized user is approaching the vehicle.

5. The method of claim 4, wherein determining that the authorized user is approaching the vehicle comprises:
   detecting, using a wireless sensor, that the authorized user is approaching the vehicle;
   detecting a user approaching the vehicle in one or more images captured by an image sensor; and
   correlating the detected authorized user with the user approaching the vehicle detected in one or more image frames.

6. The method of claim 5, wherein detecting, by the processor, the object within the proximity of the authorized user comprises:
   determining that the object is approaching the vehicle; and
   correlating a movement of the object approaching the vehicle with another movement of the detected authorized user approaching the vehicle.

7. The method of claim 4, further comprising:
   determining a velocity associated with the authorized user approaching the vehicle; and
   determining the time to cause the actuation based at least in part on the determined velocity associated with the authorized user approaching the vehicle.

8. The method of claim 1, wherein the vehicle comprises a plurality of closures and the method further comprises:
   selecting one of the plurality of closures for the actuation based at least in part on at least one of: a user preference, closure actuation history, historical behavior of the authorized user, a characteristic of the detected object, trajectory of the authorized user to the vehicle, or an environmental condition, wherein the closure of the vehicle corresponds to the selected one of the plurality of closures.

9. The method of claim 8, wherein the user preference indicates one of the plurality of closures which was previously set via user input as a default closure for the detected object, or for objects of a same class as the detected object.

10. The method of claim 8, wherein the closure actuation history indicates at least one of: a first closure of the plurality of closures that was previously actuated to retrieve the detected object from the vehicle, or a second closure of the plurality of closures that was previously actuated to place the detected object, or objects of a same class as the detected object, into the vehicle.

11. The method of claim 8, wherein the historical behavior of the authorized user indicates one of the plurality of closures that was previously actuated in association with the authorized user to place the detected object, or objects of a same class as the detected object, into the vehicle.

12. The method of claim 8, wherein the characteristic of the detected object comprises at least one of a size of the detected object or a temperature requirement associated with the detected object or objects of a same class as the detected object.

13. The method of claim 8, wherein the environmental condition indicates a current weather condition.

14. The method of claim 1, further comprising:
   obtaining a base machine learning model, the base machine learning model having been trained based on closure actuation data corresponding to a plurality of users and a plurality of objects.

15. The method of claim 14, wherein causing, by the processor, an actuation associated with a closure of the vehicle based at least in part on the detected authorized user and the detected object comprises:
   determining, using the base machine learning model, a likelihood that the detected authorized user is approaching the vehicle and intends to open the closure; and
   causing, by the processor, the actuation associated with the closure of the vehicle when the likelihood exceeds a threshold value.

16. The method of claim 15, further comprising:
   collecting user-specific closure actuation data corresponding to the authorized user and a second plurality of objects; and
   refining the base machine learning model based at least in part on the user-specific closure actuation data.

17. A semiconductor device comprising:
   circuitry configured to:
      detect, via a first sensor, an authorized user approaching a vehicle;
      detect, via a second sensor, an object approaching the vehicle coincident with the authorized user approaching the vehicle, the second sensor being a different type of sensor than the first sensor;
      determine a time to cause an actuation associated with a closure of the vehicle based at least in part on an approach of the authorized user to the vehicle; and
      cause the actuation associated with the closure of the vehicle based at least in part on the detected authorized user, the detected object, and the time to cause the actuating.

18. The semiconductor device of claim 17, wherein the circuitry is further configured to:
   determine a classification of the detected object; and
   cause the actuation associated with the closure of the vehicle further based at least in part on the classification of the detected object.

19. A non-transitory machine-readable medium storing instructions that, when executed by one or more processors, cause the one or more processors to perform operations comprising:
- detecting that an authorization device corresponding to an authorized user is approaching a vehicle;
- detecting that an object is approaching the vehicle in association with the authorization device approaching the vehicle, the object being separate from the authorization device;
- determining a time to cause an actuation associated with one or more closures of the vehicle based at least in part on an approach of the object to the vehicle; and
- in response to detecting that the object is approaching the vehicle in association with the authorization device approaching the vehicle, causing the actuation of the one or more closures of the vehicle based on the time to cause the actuation.

20. The non-transitory machine-readable medium of claim 19, wherein the operations further comprise:
- detecting that the authorized user is approaching the vehicle coincident with the authorization device approaching the vehicle, the detecting of the authorized user being separate from the detecting of the authorization device.

* * * * *